United States Patent [19]

Karger et al.

[11] Patent Number: 5,339,449
[45] Date of Patent: Aug. 16, 1994

[54] SYSTEM AND METHOD FOR REDUCING STORAGE CHANNELS IN DISK SYSTEMS

[75] Inventors: Paul A. Karger, Acton, Mass.; Andrew H. Mason, Hollis, N.H.; John C. R. Wray, Shrewsbury, Mass.; Paul T. Robinson, Arlington, Mass.; Anthony L. Priborsky, Gardner, Mass.; Clifford E. Kahn, Framingham, Mass.; Timothy E. Leonard, Cambridge, England

[73] Assignee: Digital Equipment Corporation, Maynard, Mass.

[21] Appl. No.: 105,762

[22] Filed: Aug. 11, 1993

Related U.S. Application Data

[63] Continuation of Ser. No. 485,216, Feb. 26, 1990, abandoned, which is a continuation-in-part of Ser. No. 373,872, Jun. 30, 1989, abandoned.

[51] Int. Cl.$^5$ .............................................. G06F 13/38
[52] U.S. Cl. ............................. 395/700; 364/DIG. 1; 364/230.1; 364/228.1; 364/281.8; 364/281.3
[58] Field of Search .................... 395/700; 364/281.3, 364/281.8, 230.1, 228.1

[56] References Cited

U.S. PATENT DOCUMENTS

| | | | |
|---|---|---|---|
| 4,536,837 | 8/1985 | Olson et al. | 364/200 |
| 4,742,447 | 5/1988 | Duvall et al. | 364/200 |
| 4,761,737 | 8/1988 | Duvall et al. | 364/300 |
| 4,764,982 | 8/1988 | Pfund | 455/606 |
| 4,888,691 | 12/1989 | George et al. | 364/300 |

OTHER PUBLICATIONS

Peterson and Silberschatz: "Operating Systems Concepts", 1983, Addison Wesley Publishing Co., Chapter 4 pp. 91–129, Reading, Mass.
Fourth Aerospace Computer Security Applications Conference, Dec. 12, 1988, Orlando, Florida, U.S.A., pp. 22–29, K. A. Nyberg: "Denial of Service Flaws in SDI Software—An Initial Assessment".
Iliffe, J. K., "Advanced Computer Design"—Prentice Hall International, 1982, p. 373, Englewood Cliffs, New Jersey.
"Program Confinement in KVM/370," Schaefer, M., Gold, B., Linde, R., & Scheid, J., Proceedings 1977 Annual Conference, Assoc. for Computing Machinery, Oct. 16–19, 1977, pp. 404–411.
"Finite-State Noiseless Covert Channels," Millen, J. K., Computer Security Foundations Workshop II, Jun. 12–14, 1989, pp. 81–86.
"New Methods for Immediate Revocation," Karger, P. A., Proceedings, 1989 IEEE Computer Soc. Symposium on Security and Privacy, May 1–3, 1989, pp. 48–55.
Davies, D. W. et al., "Computer Networks and Their Protocols" John Wiley & Sons, pp. 130–133.

Primary Examiner—Gareth D. Shaw
Assistant Examiner—A. Katbab
Attorney, Agent, or Firm—Arnold, White & Durkee

[57] ABSTRACT

A digital computer system includes at least one process, an input/output subsystem, and an input/output interface. The process which input/output requests and receives input/output responses. The input/output system perform input/output operations and generates completion notifications in response thereto. The input/output interface generates input/output responses for the process in the order in which the process issued the input/output requests, to reduce the possibility of the process obtaining information from the order in which the input/output system processed input/output requests.

29 Claims, 6 Drawing Sheets

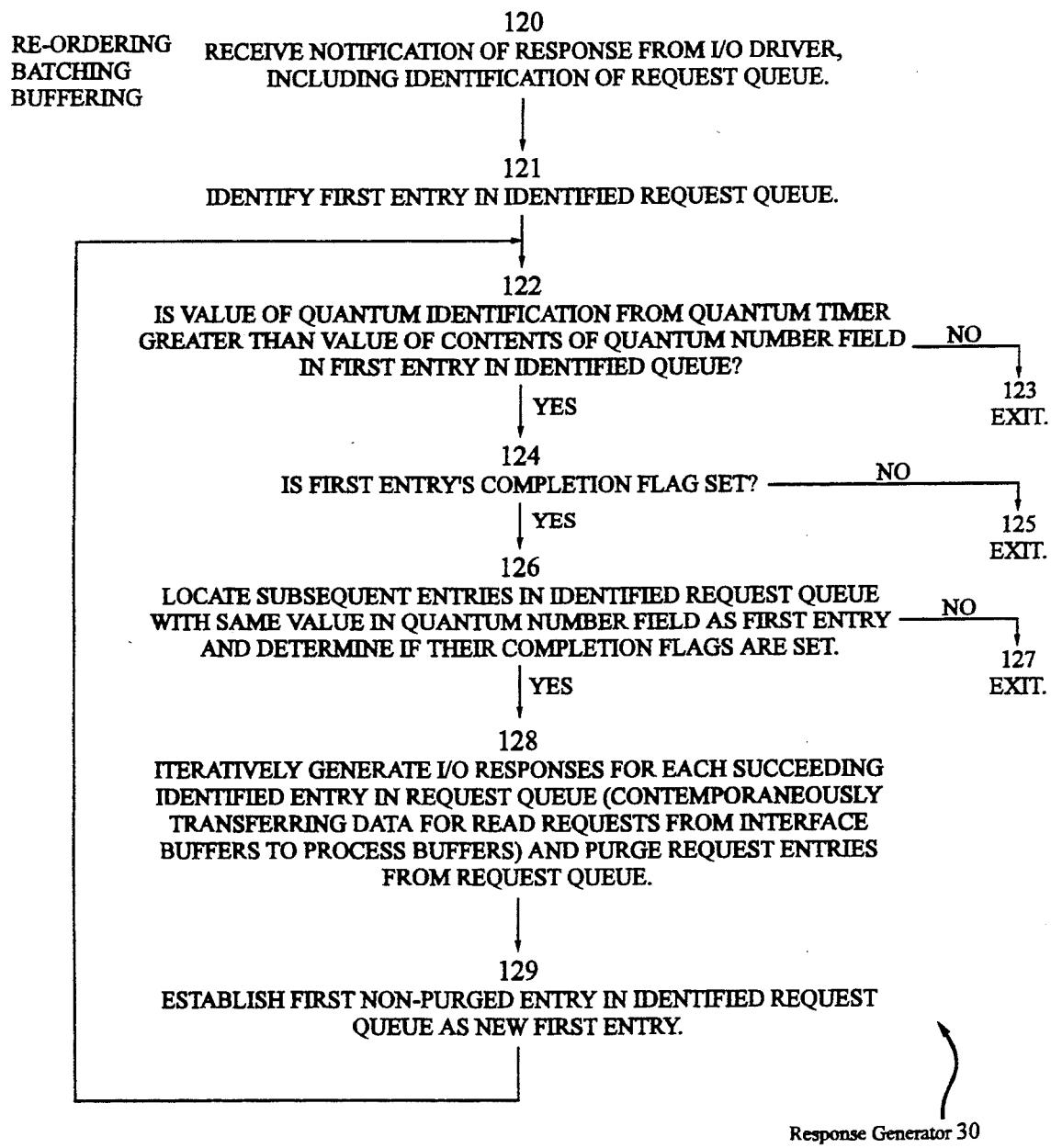

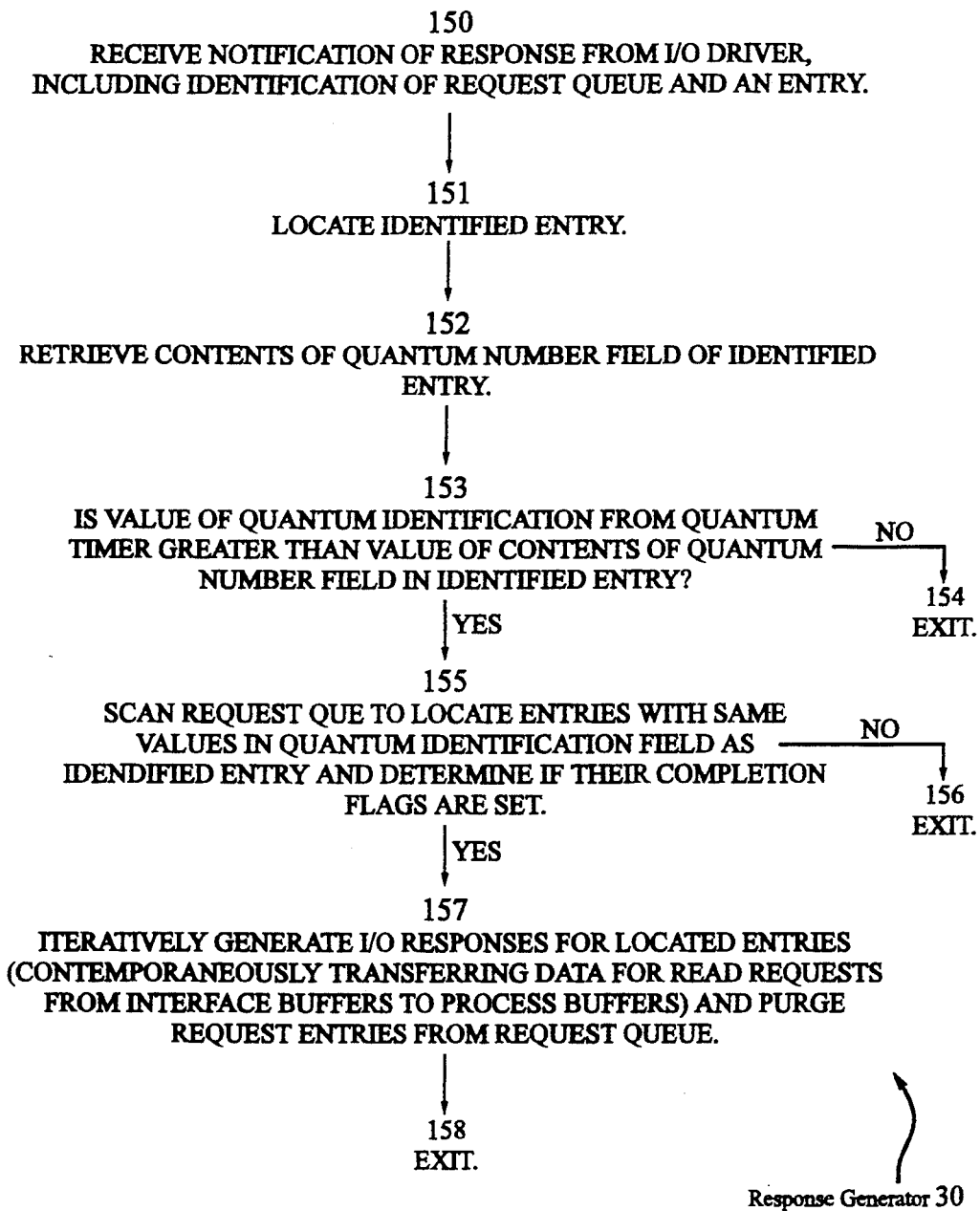

SYSTEM AND METHOD FOR REDUCING STORAGE CHANNELS IN DISK SYSTEMS

CROSS REFERENCE TO RELATED PATENT APPLICATION

This application is a continuation of application Ser. No. 07/485,216, filed Feb. 26, 1990, now abandoned, which is a continuation in part of U.S. patent application Ser. No. 07/373,872, filed Jun. 30, 1989, now abandoned, in the name of Paul A. Karger, et al., for System and Method For Reducing Storage Channels In Disk System.

FIELD OF THE INVENTION

The invention relates generally to the field of digital computer systems, and more specifically to operating systems for use in such computer systems for inhibiting undesired communications between programs operating in different processes.

BACKGROUND OF THE INVENTION

A digital data processing system includes three basic elements, namely, a processor, a memory and an input/output system.

The memory stores information in addressable storage locations. This information includes data and instructions for processing the data. The processor fetches information from the memory, interprets the information as either an instruction or data, processes the data in accordance with the instructions, and returns the processed data to the memory for storage therein. The input/output system under control of the processor, also communicates with the memory element to transfer information, including instructions and data to be processed, to the memory, and to obtain processed data from the memory. Typically, the input/output system includes a number of diverse types of units, including video display terminals, printers, interfaces to the public telecommunications network, and secondary storage subsystems, including disk and tape storage devices.

Instructions processed by the processor are organized into one or more programs, each of which is executed in the context of a "process." A modern digital computer system typically can execute a plurality of processes concurrently. For example, a modern computer system may execute, in an interleaved fashion, a predetermined maximum number of processes each generally for selected amounts of time. At the end of a process's processing time, the computer system will stop processing that process and begin processing another process. A computer system may terminate processing of a particular process if the process, for example, requests an input/output operation, such as a transfer to or from a disk unit. Since, when a process requests such an input/output operation, the computer system typically waits until the completion of the input/output operation before it resumes processing the process that requested the input/output operation, and since an input/output operation typically can take a considerable amount of time, relative to the time required for the computer system to execute instructions, the computer switches to another process when a process that it is currently executing requests an input/output operation. While, with this "multi-programming" facility, the computer system may take longer to process each individual program, since the program's process is only executed during its assigned time slots, it will be appreciated that multi-programming does permit the computer system to process a plurality of programs in less total time, at least in part because the computer system is not stalled waiting for input/output operations to complete.

Multi-programming also provides other advantages, most notably that a number of processes may share and concurrently process, in a regulated manner, data stored in shared storage devices, such as, for example, disk storage units. To enhance the security of data, that is, to reduce the likelihood that data can be read or altered by unauthorized processes, computer systems often provide extensive security facilities for regulating access to particular data files by the various processes.

However, security of data in digital computer systems may be threatened by covert transmission of data between cooperating processes. For example, a process which has access to high-secrecy data may transmit the data to a process which is not authorized to read the disk files which contain the data. This may be accomplished by a "Trojan horse" in the process having access to the high-secrecy data (the "high-secrecy process") controlling various resources in the computer system which it shares with the other process, identified as the "spy process." The "Trojan horse" is a clandestine program in the high-secrecy process which may be unknown to the user of other programs in the high-secrecy process, and both it and the spy process can manipulate and observe the conditions of the shared resources. The shared resources thereby provide "channels" which can be used by the Trojan horse and the spy process to facilitate the convert transmission of high-secrecy information to the other process which would otherwise not have access to it.

Two general types of convert channels have been identified in computer systems, namely, timing channels and storage channels. Timing channels may arise as a result of the availability or unavailability of particular system resources during particular time intervals. For example, some types of instructions cause the processor to test system resources, such as interlocks, to determine whether they are set or cleared. Some such instructions may, for example, enable the processor to test the condition of an interlock to determine whether it is set, and, if not, set the interlock and perform some other operation. On the other hand, if, upon testing the condition of the interlock, the processor determines that the interlock is set, the processor stalls until the interlock is later cleared. Others of such instructions enable the processor to clear the interlock. Thus, if a program in one process issues an instruction that enables the processor to set an interlock, while the interlock is set, the processor stalls if another program attempts to execute a similar instruction until the interlock is cleared by the program in the first process. A Trojan horse in one process may transmit data by varying the rate at which it enables the processor to set the interlocks, and the spy process may determine the values of the data by determining the rates, at various times, at which it can concurrently enable the processor to execute instructions which would also set the interlock.

Storage channels also arise in response to control of shared resources, some of which may relate to various elements of a secondary storage subsystem. The storage channels may arise in a number of ways. Some storage channels may arise from various techniques which have been adopted to optimize use of, for example, a secondary storage subsystem in which data is stored in a movable-head disk storage device. A number of optimization techniques may be used in, for example, disk secondary storage subsystems to maximize the rate in which data may be stored in, or retrieved from a disk subsystem. For example, typically requests from a host to a disk subsystem to read data from, or write data to, various tracks on a disk are issued for tracks at random. If the disk subsystem were to process the requests in the order in which they were issued, the disk arm would be moving the disk head randomly over the tracks of the disk.

In one well-known optimization technique, known as the "elevator" technique, rather than moving the disk head randomly over the disk, the disk arm is controlled to sweep the head in alternate directions over the disk, that is, first from the rim toward the center, and, when it reaches the center, from the center toward the rim. As the arm moves the head over the disk, for example, track by track from the rim toward the center, the disk subsystem may store data on or read data from the successive tracks as it comes to them, and similarly as the arm moves the head from the center toward the rim, effectively processing the requests out of order. While the disk subsystem using the elevator technique may take longer to process a particular request, it processes large numbers of requests in less time since generally less total arm movement is required to process the requests.

However, since the elevator technique results in non-random movement of a disk head, a Trojan horse in one process can, by issuing requests to the disk subsystem, influence the direction of arm movement, which can be observed by the spy process. For example, suppose a spy process initially enables the disk arm to move the head to track 55, and stalls the processor until it receives notification that the disk head has reached track 55. Suppose further that the Trojan horse issues a request to enable the disk arm to move the head to one of two tracks on either side of track 55, with the direction identifying a particular data value (more specifically, suppose that the Trojan horse issues a request to enable the disk arm to move the disk head to track 53 to indicate a data value of zero, or to track 57 to indicate a data value of one) and immediately enables the processor to begin processing another process, in particular the spy process.

The spy process may determine the direction of arm movement enabled by the Trojan horse by issuing two requests which enable the disk arm to move the disk head to, for example, track 52 and track 58. Since the disk subsystem is implementing the elevator technique, if the Trojan horse had enabled the disk arm to move the head to track 53, since the direction of arm movement is toward lower-numbered tracks, the disk subsystem would complete the spy process's request to enable the disk arm to move the disk head to track 52, before it completed its request to enable the disk arm to move the disk head to track 58. Thus, when the spy process is notified of the completion of the request to move the head to track 52, it will determine that the Trojan horse had transmitted a data value of zero. However, if the Trojan horse had enabled the disk arm to move the disk head to, for example, track 57, since the direction of arm movement is toward higher-numbered tracks, the disk subsystem would first complete the spy process's request to enable the disk arm to move the disk head to track 58, so that, when the spy process is notified of the completion of that request, it will determine that the Trojan horse had transmitted a data value of one.

The use of the direction of movement of the disk arm as a covert channel can be eliminated by not using optimization techniques such as the elevator algorithm, as was suggested in M. Schaefer, et al., "Program Confinement In KVM/370", Proceedings of the 1977 ACM Annual Conference, 16–19 October 1977, Seattle, Wash., pp. 404–410. However, in some cases optimization techniques are architecturally specified in disk subsystems and cannot be eliminated, and in other cases the optimization techniques provide such significant improvements in disk performance that it is undesirable to eliminate them.

SUMMARY OF THE INVENTION

The invention provides a new and improved digital computer system, and more specifically an operating system for use in a computer system, for inhibiting undesired communications between programs operating in different processes.

In brief summary, the invention provides a process input/output interface for use in a digital computer, the digital computer processing at least one process which generates input/output requests and receives input/output responses, the digital computer further including an input/output system for performing input/output operations and for generating completion notifications in response thereto, said process input/output interface comprising:

A. a request queue for storing a series of entries, each of an input/output request, each entry enabling an operation by said input/output system;

B. a queue entry generator for generating entries for said request queue in response to input/output requests from said process;

C. an input/output driver for iteratively enabling operations by said input/output system in response to successive entries in said request queue and for receiving completion notifications from said input/output system; and D. a response generator responsive to receipt, by said input/output driver, of completion notifications from said input/output system for generating input/output responses for said process, said response generator generating input/output responses for successive entries in the request queue for which the input/output system has provided a completion notification.

In another aspect, the invention provides a process input/output interface for use in a digital computer, the digital computer processing at least one process which generates input/output requests and receives input/output responses, the digital computer further including an input/output system for performing input/output operations and for generating completion notifications in response thereto, said process input/output interface comprising:

A. a request queue for storing a series of entries, each for an input/output request, each entry enabling an operation by said input/output system;

B. a quantum number generator for generating a time quantum value;

C. a queue entry generator for generating entries for said request queue in response to input/output requests from said process, said queue entry generator associating each request queue entry with a time quantum value from said quantum number generator;

D. an input/output driver for iteratively enabling operations by said input/output system in response to successive entries in said request queue and for receiving completion notifications from said input/output system; and E. a response generator responsive to receipt, by said input/output driver, of completion notifications from said input/output system for generating input/output responses for said process, said response generator generating input/output responses for entries in the request queue for which the input/output system has provided a completion notification in response to the entries' respective time quantum values.

In yet a further aspect, the invention provides an input/output interface program for controlling a processor in a digital computer, the digital computer processing at least one process which enables said processor to generate input/output requests and receive input/output responses, the digital computer further including an input/output system for performing input/output operations and for generating completion notifications in response thereto, said process input/output interface program comprising:

A. a queue entry generator module for enabling said processor to generate entries in a request queue in response to an input/output request, each entry enabling an operation by said input/output system;

B. an input/output driver module for enabling said processor to iteratively enable operations by said input/output system in response to successive entries in said request queue and to receive completion notifications from said input/output system; and C. a response generator module for enabling said processor to generate input/output responses for use during processing of said process, for successive entries in the request queue for which the input/output system has provided a completion notification.

In yet a further aspect, the invention provides an input/output interface program for controlling a processor in a digital computer, the digital computer processing at least one process which enables said processor to generate input/output requests and receive input/output responses, the digital computer further including an input/output system for performing input/output operations and for generating completion notifications in response thereto, said process input/output interface program comprising:

A. a quantum number generator module for enabling said processor to generate a time quantum value;

B. a queue entry generator module for enabling said processor to generate entries in a request queue in response to an input/output request, each entry enabling an operation by said input/output system and having an associated time quantum value from said quantum number generator;

C. an input/output driver module for enabling said processor to iteratively enable operations by said input/output system in response to successive entries in said request queue and to receive completion notifications from said input/output system; and D. a response generator module for enabling said processor to generate input/output responses for use during processing of said process, for entries in the request queue for which the input/output system has provided a completion notification in response to the entries' respective time quantum values.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
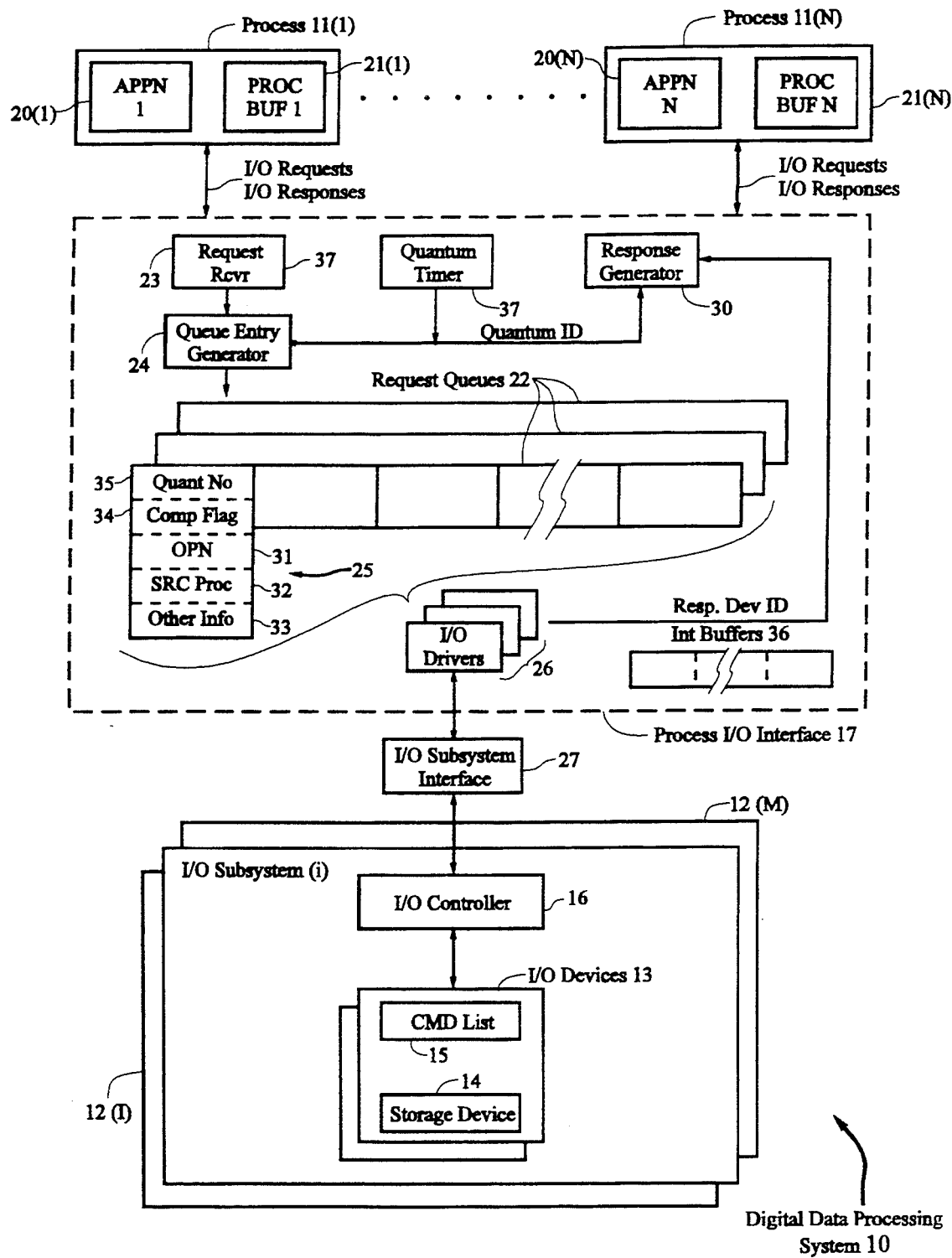
FIG. 1 is a functional block diagram of a digital data processing system constructed in accordance with the invention.

FIG. 1 depicts a functional block diagram of a digital data processing system 10 constructed in accordance with the invention. With reference to FIG. 1, the system includes a set of processes 11(1) through 11(N) (generally identified by reference numeral 11) which may be processed concurrently by processing elements (not shown) in the system 10. In one embodiment, the processing elements in system 10, such as the central processor units which process the processes 11 and portions of the operating system that schedule processing of the processes 11 by the central processor units, are conventional, and they will not be described further herein.

System 10 also includes one or more input/output subsystems 12(1) through 12(M) (generally identified by reference numeral 12) that provide storage of data and instructions used in connection with processing of processes 11. The input/output subsystems 12 are generally similar, and only one, namely, subsystem 12($i$) is shown in detail. Each input/output subsystem 12 includes one or more input/output devices, generally identified by reference numeral 13, each of which includes a storage device 14, such as a disk storage unit, in which data and instructions are actually stored and from which they are retrieved. A storage device 14 comprising a disk storage unit generally includes one or more magnetic disks, spinning around a common spindle, and a plurality of heads, suspended from pivoted arms which move the heads, in unison, across the disk surface, to effect reading and writing of data thereon. The sequence of operations performed by a storage device 14 are defined by a command list 15 that lists commands comprising the identification of storage locations on the disks and the operations, such as storage or retrieval, to be performed at each location. The series of commands in the command list 15 is established by an input/output controller 16 as described below. It will be appreciated that, in the system 10, an input/output subsystem 12 may comprise a plurality of input/output devices 13, each with a storage device 14 and command list 15, with all input/output devices in the input/output subsystem 12 being controlled by a single input/output controller 16.

Each process 11 includes an application program, generally identified by reference numeral 20, that may enable a storage operation in an input/output device 13 by issuing an input/output request to a process input/output interface 17. The input/output operation set forth in the request may enable the transfer of the contents of an identified process buffer, generally identified by reference numeral 21, maintained by the associated process 11, to a location in a storage device 14, with both the storage device 14 and the location being identified in the input/output request. Alternatively, the input/output operation set forth in the request may enable the transfer of the contents of a location in a storage device 14 to a process buffer 21 associated with the process 11 that issued the input/output request, with both the location in the storage device 14 and the process buffer 21 being identified in the input/output request. Each input/output request issued by a process thus identifies the operation to be performed, such as a storage operation or a retrieval operation, an input/output storage device 13 and a location therein, as well as a buffer 21 maintained by the process.

The process input/output interface maintains a plurality of request queues, generally identified by reference numeral 22, with a request queue 22 being provided for each input/output device 13. The process input/output interface 17 includes a request receiver 23 that receives the input/output requests from the processes and transfers them to a queue entry generator 24, which generates request queue entries, generally identified by reference numeral 25, for storage in the request queue 22 of the input/output device 13 to perform the requested input/output operation. In response to receipt of an input/output request from the request receiver 23, the queue entry generator 24 identifies the particular input/output device 13 to perform the requested operation, and generates a queue entry 25, which it enqueues onto the request queue 22 for the input/output device 13.

The process input/output interface 17 also includes one or more input/output drivers, generally identified by reference numeral 26, which transmit input/output requests from the request queues 22 to the input/output subsystems 12 and which receive responses therefrom indicating their status in executing the requests. The process input/output interface 17 includes one driver 26 for each diverse type of input/output subsystem 12 in the system 10. As is conventional, a system 10 may comprise several diverse types of input/output subsystems 12, and the diverse types of subsystems 12 may have different protocols by which they receive input/output requests from the process input/output interface 17 and by which they transmit responses thereto, and each input/output driver 26 transmits requests to and receives responses from the input/output subsystems of the type which it supports.

A driver 26 may transmit input/output requests, from an input/output device's request queue, to the input/output subsystem 12 including the input/output device 13, through an input/output subsystem interface 27 to which both the driver 26 and the input/output subsystem 12 have access. The input/output subsystem interface 27 may take many forms.

In one specific embodiment, an input/output subsystem interface 27 may include shared buffers to which both the driver 26 and input/output controller 16 have access, such as a circular queue described in U.S. Pat. No. 4,449,182, issued May 15, 1984, to Barry Rubinson, et al., and entitled Interface Between A Pair Of Processors, Such As Host And Peripheral-Controlling Processors In A Data Processing System, and assigned to the assignee of this application. In that embodiment, a driver 26 loads, into successive locations of a circular command queue (not shown) in an input/output subsystem's interface 27, a series of command messages representing input/output requests from successive entries in the request queues 22 associated with the input/output devices 13 of the input/output subsystem 12. The subsystem's input/output controller 16 may iteratively (a) retrieve a number of the command messages from the command queue, (b) separate them into groups each associated with the particular input/output device 13 to perfor the input/output operation specified by the command message, and (c) perform predetermined processing operations on the command messages, in accordance with the optimization techniques (if any) provided for the respective input/output devices 13, to generate a series of commands which it loads into the associated input/output device's command list 15.

The input/output device 13 then processes the commands from the command list in order and the input/output controller 16 loads, into a response queue in its input/output subsystem interface 27, a response message indicating the status of the input/output operation, indicating, for example, whether it was successfully completed. The input/output driver 26 transmits the response to a response generator 30, which, in turn, notifies the process 11 which generated the input/output request. In one particular embodiment, in which the system 10 processes the processes 11 in a multi-programmed manner, the response generator 30 delays notification of a process until the time slot during which it is to be processed. In addition, when the process receives notification of the status of the input/output request, the queue entry 25 related thereto can be purged from the request queue 22.

As described above, since the input/output controller 16 may re-order the commands in the command messages which it retrieves from the command queue in its input/output interface 27 according to various optimization techniques, a covert storage channel may arise by which a Trojan horse, operating in one process 11(i) may transmit data to a cooperating spy process in another process 11(j). In accordance with the invention, the process input/output interface 17 implements several techniques (identified in the following as "re-ordering," "buffering," "batching," and "synchronization") to conceal the optimizations from the processes 11, which would reduce the bandwidth of the covert storage channel.

In the re-ordering technique, the responses provided to the processes 11 reporting status of an input/output request to a particular input/output device 13 are reported in the order the input/output requests issued, that is, the order of their associated entries 25 in the request queue 22 associated with the input/output device 13, rather than in the order in which the process input/output interface 17 actually receives the responses. Since the status is reported in the same order as the input/output requests, a spy process cannot determine, based on the order in which it receives input/output responses from the process input/output interface 17, the order in which the input/output device 13 actually completed an input/output operation and the input/output controller 16 provided the response messages to the input/output subsystem interface 27.

Thus, in accordance with the re-ordering technique, the response generator 30 will generate responses for a series of requests associated with entries 25 in a request queue, only when responses have been received for all of the entries in the series. Each entry 25 in a request queue 22 includes several fields, some of which assist in accommodating the re-ordering technique. As is conventional, each entry 25 in a request queue 22 includes, in addition to fields such as an operation identification field 31 which specifies the input/output operation to be performed, a source process field 32 which identifies the process 11 whose input/output request resulted in creation, by the queue entry generator 24, of the entry 25, and a field 33 for storing other information of assistance in carrying out the operation, such as identification of the location in storage device 14 and the process buffer 21 with respect to which the input/output operation is to be performed. In addition, field 33 may contain a tag value which may associate the request in the entry 25 with a particular input/output request received from the process 11; the process 11 may supply the tag value in the input/output request, which may be unique across all input/output requests generated by the process 11, and the response generator 30 may include the tag value in a response to the process 11 to enable it to associate the response with a particular input/output request.

To assist in accommodating the re-ordering technique, the request entry 25 also includes a completion flag 34, which the queue entry generator 24 clears when creating the entry 25, and which the input/output driver 26 later sets upon receipt of a response message from the input/output subsystem interface 27 for the request in the entry 25. The input/output driver 26 may also transmit the identification of the input/output device 13, which performed the operation which resulted in generation, by the controller 16, of the response message, to the response generator 30. In response, the response generator 30 may scan the completion flags 34 of the entries 25 in the request queue 22, from the beginning of the request queue 22, to determine whether completion flags for a series of entries 25, beginning with the first entry in the request queue, are set. If the response generator identifies such a series of entries 25, it may report the responses for those entries 25 to the respective processes 11, and purge that series of entries 25 from the request queue 22.

It will be appreciated that, since, after purging entries 25 associated with responses which have been reported to the processes 11, the first entry 25 in a request queue 22 will be one for which the input/output driver 26 has not received a response message from the input/output subsystem interface 27, the completion flag 34 of the first entry 25 in the request queue 22 will be clear. Thus, the response generator 30 may determine whether to report any responses associated with operations initiated by any entries 25 in a particular request queue 22 by testing the completion flag of the first entry 25 in the request queue 22. That is, if, in response to a notification from an input/output driver 26 that a response has been received from a particular input/output device 13, the response generator determines that the completion flag 34 of the first entry 25 of the request queue 22 associated with the input/output device 13 is clear, it will not report any responses to the processes 11; however, if the response generator 30 determines that the completion flag 34 of the first entry 25 is set, it will report responses for that entry 25 and for succeeding entries 25 in the request queue whose completion flags are set, up to the first entry 25 whose completion flag 34 is clear.

It will be further appreciated that, since the process input/output interface 17 may not report the responses to the processes 11 as it receives them, it may need to temporarily store them until they are to be reported. The responses may be deposited in field 33 in the respective entries 25 in the particular request queue 22, or they may be stored in a separate buffer (not shown) by the response generator 30, until they are to be reported.

The process input/output interface 17 has been described as performing re-ordering on a system-wide basis, that is, of generating input/output responses in the order in which the associated input/output request are queued in entries 25 in a request queue, without regard to the process 11 which generated the input/output request. Thus, the response generator will delay transferring an input/output response to a process 11 until input/output responses have been generated for all preceding entries in 25 the request queue 22. However, it will be appreciated that the response generator 30 may, instead, perform re-ordering in connection with input/output responses on a per-process basis; that is, the response generator 30 may delay transferring input/output responses to a process 11 only until input/output responses have been generated for preceding entries 25 in the request queue 22 relating to input/output requests from the process 11. That is, the response generator 30 may provide responses to each process 11 for a series of entries 25 in the request queue 22 for the process's own input/output requests, even if there are entries 25 in advance of that entry, or between those entries being reported, in the request queue 22 whose completion flags 34 have not been set, if those other entries 25 relate to input/output requests from other processes 11. This may be accomplished in several ways. For example, the response generator 30 may scan a request queue 22 to determine whether it contains entries 25 whose source process field 32 identifies a particular process 11, and generate input/output responses only for entries 25 in the response queue 22 for that process 11. Alternatively, each request queue 22 may be divided into a plurality of sub-queues, each associated with one of the processes. This may be accomplished by including, in addition to conventional queue forward and backward pointers (not shown) which define the series of entries 25 in the request queue 22, process-specific forward and backward pointers (also not shown) which define the series of entries 25 for a specific process.

As noted above, a storage operation initiated by a process 11 enables an input/output subsystem 12 to transfer data to or from a process buffer 21 maintained by the process 11. If a process 11 is a spy process, and if the input/output operation enables the input/output subsystem 12 to transfer data into the process buffer 21, the process 11 may determine the order of completion of, or progress in connection with processing of, input/output requests by (1) establishing the requests to transfer different data values to a process buffer 21, and (2) thereafter examining the data in the process buffer 21 to determine which data was transferred into the buffer 21 first. In examining the data in the process buffer 21, the process 11 may either periodically read the contents of the process buffer 21 after issuing the input/output request, so as to examine the data while the transfers are taking place, or it may wait until the transfers have been completed and examine the data at that point to determine which transfer was completed last. A process 11 may also be able to determine the timing of one specific transfer from an input/output subsystem 12 to its process buffer 21 in a similar manner, if the data to be transferred differs from the data then in the process buffer 21. In particular, the process may issue the request and thereafter periodically read the contents of the process buffer 21. The transfer occurs when the contents of the process buffer 21 change. In any case the effectiveness of the re-ordering technique would be reduced, since the input/output subsystem 12, and not the process input/output interface 17, controls the order and timing with which data is transferred into the process buffer 21, which would be detectable by the process 11.

To avoid this problem, the process input/output interface 17 also provides interface buffers 36, and enables the input/output subsystems 12 to transfer the data into its interface buffers 36, rather than directly into the process's process buffers 21. Thereafter, when the process input/output interface 17, in particular, its response generator 30, generates the response for the process 11, it transfers the data from the interface buffers 36 in the process input/output interface 17 to the process's process buffer 21. If buffering is done in conjunction with re-ordering, the buffering technique prevents a process 11, which is a spy process, from determining that a particular series of input/output operations completed in any particular order, other than the order in which it issued the requests, by reading the contents of the process buffer. In addition, the buffering technique prevents a process 11 from determining the actual timing of a transfer since the process no longer has access to the data buffer used by the input/output subsystem 12 for the actual transfer. The buffering technique may also be used in conjunction with any other technique for ordering the reporting of responses to the various processes, with the two techniques jointly effectively hiding the actual order in which an input/output device performs input/output operations.

While the buffering technique has been described as being useful in connection with read operations, that is input/output operations enabling data to be transferred into the spy process's process buffer 21, it will be appreciated that a spy process 11 may also be able to obtain similar information through write operations, which enable data to be transferred from its process buffer 21 for storage in a storage device 13. For example, a spy process 11 may issue an input/output request to the process input/output interface 17, which establish a request entry 25 in the appropriate request queue 22. The input/output request identifies the input/output operation as a write operation and identifies the process buffer 21 as the source of the data to be written. The spy process then begins periodically loading data, which differs from the data then in the buffer, into the process buffer 21. While the input/output subsystem 12 is processing the input/output request, it retrieves the data from the spy process's process buffer 21 for storage in the storage device 14. If the spy process 11, after receiving the input/output response indicating completion of the storage operation, retrieves the data that was stored in the storage device 14, it can determine when the input/output subsystem began processing the input/output request by determining the proportion of new data and old data that the input/output subsystem 12 stored in the storage device 14. Thus, in accordance with the buffering technique, upon receipt of an input/output request from a process 11 specifying a write operation, the queue entry generator 24, contemporaneously with creating a queue entry 25 for the input/output request, also transfers the data from the process's buffer 21 to the interface buffers 36. When the input/output subsystem processes the input/output request, the input/output subsystem retrieves the data from the interface buffers 36 instead of the process's process buffer 21.

Instead of the buffering technique, other techniques may be used to accomplish similar results. For example, if, as is conventional, the system 10 includes a memory manager (not shown) that provides each process 11 with a virtual address space comprising a plurality of pages each identified by a page table entry in a page table (also not shown), the memory manager may de-allocate, from the process's address space, pages containing data for which the process 11 issues an input/output request, and re-allocate the pages when issuing the input/output response. De-allocation may be accomplished by invalidating the page table entries in the process's page table for the pages to be de-allocated, and re-allocation may be accomplished by re-validating the previously-invalidated page table entries.

A problem may arise with the de-allocation and re-allocation technique, however, since the same page may be allocated to a plurality of processes, or to a plurality of pages in the process's own address space. In that case, the memory manager would have to de-allocate the page from the address spaces for all of the processes, by invalidating the page table entries in their respective page tables, when one process issues an input/output request for that page, and re-allocate the page to all processes, by re-validating the page table entries in their respective page tables, when the process input/output interface 17 issues an input/output response to the process in response to the input/output request. This can be accomplished in several ways. For example, the page table entries in the various page tables for the processes in which the page is mapped can be chained together, as described in P. Karger, "New Methods for Immediate Revocation," Proceedings, 1989 IEEE Computer Society Symposium on Security And Privacy (Oakland, Calif. 1989), pages 48–55. In that case, a page table entry in one page table for a page which is allocated to multiple processes is provided with a pointer to a page table entry for the page in the page table of another process in which the page is mapped. The series of pointers among the various page tables essentially forms a chain or loop. When the memory manager invalidates the page table entry in one page table, it follows the pointers in that and successive page table entries to the other page table entries in the chain and invalidates them as well. When the memory manager later re-validates the page table entry in a page table, it follows the pointers in that and successive page table entries to the other page table entries in the chain and re-validates them.

As an alternative to the use of the chain pointers, a flag or counter may be provided for each page table entry which the memory manager conditions to indicate whether the page identified thereby has been allocated to multiple processes. When the memory manager invalidates a page table entry in a page table to de-allocate the page from the process associated with the page table, it tests the flag to determine whether it indicates that the page has been allocated to any other processes. If the memory manager determines that the flag indicates that the page has been allocated to other processes or elsewhere in its own address space, it searches through all of the page tables for any page table entries that identify the page to be de-allocated, and invalidates them as well. When the memory manager later re-validates the page table entry in a page table, it also searches through all of the page tables for any page table entries that identify the de-allocated page, and validates them to thereby re-allocate the page.

In one specific embodiment, each process 11 and the process input/out interface 17 transfer input/output requests and input/output responses through a pair of circular queues (not shown), which are similar to the input/output subsystem interface 27, as described in the aforementioned Rubinson, et al., patent. When the process input/output interface 17 loads an input/output response into a process's response queue, if the response queue was previously empty the process input/output interface 17 notifies, by means of, for example, an interrupt, the process 11. A spy process 11 can determine the order in which an input/output device 13 completes input/output operations, even if the process input/output interface 17 re-orders the responses, and buffers the data, as described above.

In particular, if a spy process 11 initially clears its response queue and issues two successive input/output requests for an input/output device 13, as described above, the spy process 11 may be able to determine which request was completed first by the input/output device 13 as follows. If the input/output device 13 first performs the operation specified in the spy process's first input/output request, and issues a response to the process input/output interface 17, the process input/output interface 17 will report the completion to the spy process 11 immediately (assuming all previous requests specified by entries in the request queue 22 for the input/output device 13 have been completed). In this operation, the response generator 30 loads an input/output response into the spy process's response queue and, since the response queue was previously empty, generates an interrupt to the spy process 11. If the spy process 11 immediately retrieves the contents of the response queue, it can determine that it only contains one input/output response, which relates to the first input/output request which is issued since the process input/output interface 17 re-orders input/output responses to conform to the order in which it received corresponding input/output requests.

On the other hand, if the input/output controller 16 enables the input/output device 13 to first perform the operation specified in the second input/output request from the spy process 11, and generates a notification thereof for the process input/output interface 17, the process input/output interface 17 will not generate an input/output response for the spy process 11 until the input/output device 13 has also performed the operation specified in the first input/output request issued by the spy process 11 and the process input/output interface 17 has been notified thereof. At that point, since the process input/output interface 17 re-orders the input/output responses to conform to the order in which it received corresponding requests, the process input/output interface 17 will load the responses into the spy process's response queue in that order, but after the process input/output interface 17 has notified the spy process 11 that its response queue is no longer empty, the spy process 11 will observe that the response queue contains two input/output responses, one for each of the input/output requests, and thereby be able to conclude that the input/output device 13 performed the second input/output request earlier.

To avoid this problem, the system 10 operates in accordance with the aforementioned batching technique. In the batching technique, the process input/output interface 17 essentially batches entries 25 in the respective request queues 22 into sequential time slots, and generates input/output responses, for transmission to the processes 11, only after the input/output device 13 has completed processing of requests for all of the entries 25 in the time slot, at or some time after the end of the time slot. With reference to the above example, if a spy process 11 issues two successive input/output requests, as described above, during successive time slots, the process input/output interface 17 will generate input/output responses for the spy process 11 as described above. However, if the spy process 11 issues the input/output requests in the same time slot, the process input/output interface 17 will not generate input/output responses for the spy process 11 until it has received a response from the input/output subsystem 12 that both had been completed, and so the spy process 11 will not be able to identify the order in which the input/output device 13 performed the request. If the spy process 11 cannot determine whether the input/output requests were in the same or different time slots, it will not be able to determine the order of completion of any particular set of input/output requests. In addition, if the response generator 30 also implements re-ordering, and if it provides a delay between issuing notifications for input/output requests of different time slots, even if the input/output requests are associated with different time slots the spy process 11 will not be able to determine the order of completion of the input/output request. This is particularly the case if information concerning the beginning, end or length of the time slots is not available to the spy process 11.

To accommodate the batching operation, the process input/output interface 17 includes a quantum timer 37, which generates a QUANTUM ID quantum identification value which it increments from time to time to identify sequential time slots. It will be appreciated that the time slots need not be of uniform duration. The queue entry generator 24, when it generates a queue entry 25 for a request queue, inserts, in a quantum number field 35 in the queue entry 25, the current quantum identification value, thereby identifying the time slot in which it generated the entry 25. Depending on the rate which the queue entry generator receives input/output requests from the request receiver 23, and the rate at which the quantum timer 37 increments the quantum identification value, a number of sequential entries 25 in the various requests queues 22 may have the same quantum identification value in their quantum number fields 35, indicating that they were created during the same time slot.

In accordance with the batching technique, the response generator 30, when it generates input/output responses for one or more processes 11 in response to receipt, from an input/output subsystem 12, of a response indicating completion of an input/output operation by an input/output device 13, generates input/output responses only for entries 25 in a request queue 22 having quantum identification values in their respective quantum number fields 35 which identifies the same time slot or an earlier time slot, and it does so only after the end of the time slot.

A further covert storage channel may arise if, for example, the input/output controller 16 modifies the order in which it lists commands, in an input/output device's command list 15, as between when the storage device's arm is moving from the disk's rim toward its center, and when the arm is moving from the center toward the rim. As described above, since a Trojan horse in a process 11 can influence the direction of movement by the disk arm, and use the direction to identify particular data values, the spy process 11 can determine the direction of arm movement in the following manner. If, for example, a spy process 11 issues two successive input/output operations, the first requesting a write operation to enable data to be stored on a particular location on the disk, which is different from the data that is then stored there, and the second requesting a read operation to the same portion of the disk, in accordance with the elevator technique the input/output controller will issue them in the command list 15 one after the other. However, if the input/output controller 16 provides commands in the command list 15 in first-in first-executed order when the arm is moving from the rim toward the center and last-in first-executed order when the arm is moving from the center toward the rim, the spy process 11 can determine which the input/output subsystem 12 completed last by examining the data provided by the input/output subsystem 12 in response to the read input/output request, and determine if it is the same or different than was originally stored in the identified portion of the disk.

That is, if the data returned by input/output subsystem 12 is the same as the data to be written in response to the write input/output request, the spy process 11 may determine that the input/output subsystem 12 had completed the write operation first, so that the input/output controller provided the write and read commands in the command list 15 in first-in first-executed order, and thus that the disk arm was moving from the rim toward the center. On the other hand, if the data returned by the input/output subsystem 12 is not the same as the data to be written in response to the write input/output request, the spy process may determine that the input/output subsystem 12 had completed the read operation first, so that the input/output controller 16 had provided the write and read commands in last-in first-executed order, and thus that the disk arm was moving from the rim toward the center.

In accordance with the synchronization technique, this channel is blocked by the queue entry generator 24 as follows. When the queue entry generator 24 establishes a new queue entry 25 in a request queue 22 for a read operation to a particular location in the input/output device 13 associated with the queue 22, it scans the entries 25 in the request queue 22 to determine if it (the queue 22) contains any entries 25 which enable a write operation to at least a portion of the input/output devices' disk specified in the read request. If so, it precedes the entry 25 in the queue 22 with another entry 25 for a "synchronize" operation. When the input/output controller 16 receives the request for the "synchronize" operation, it enables the input/output device 13 to finish execution of all of the preceding requests. That is, the input/output controller 16 will not load, into the command list 15, a command for the request in the entry 25 in the request queue 22 following the entry 25 containing the "synchronize" operation until after it has received notification from the input/output device 13 that it has finished execution of the commands relating to all of the entries 25 in the request queue 22 preceding the entry containing the "synchronize" operation. This ensures that the input/output controller 16 does not revise the order in which it will provide the commands to the input/output device 13, and thus a spy process 11 will be unable to identify any difference in the order in which the input/output device 13 has performed the operations in its input/output requests.

The synchronization technique has been described as having the queue entry generator 24 generate an entry 25 that enables the input/output controller 16 to, in turn, enable the input/output device 13 to finish execution of all requests in entries 25 of the request queue 22 preceding the entry 25 for the "synchronize" operation before it begins executing any requests in entries 25 subsequent to the entry 25 for the "synchronize" operation. It will be appreciated, however, that input/output controller 16 may instead require the input/output device 13 to only finish executing the input/output request for the write operation which gave rise to the requirement for the "synchronize" operation, before beginning execution of the input/output request for the read operation. That is, the input/output controller 16 may, in response to the input/output request for the write operation, delay execution of only the subsequent input/output request for the read operation, where both are to the same portion of the input/output device's disk.

Figure 2A:
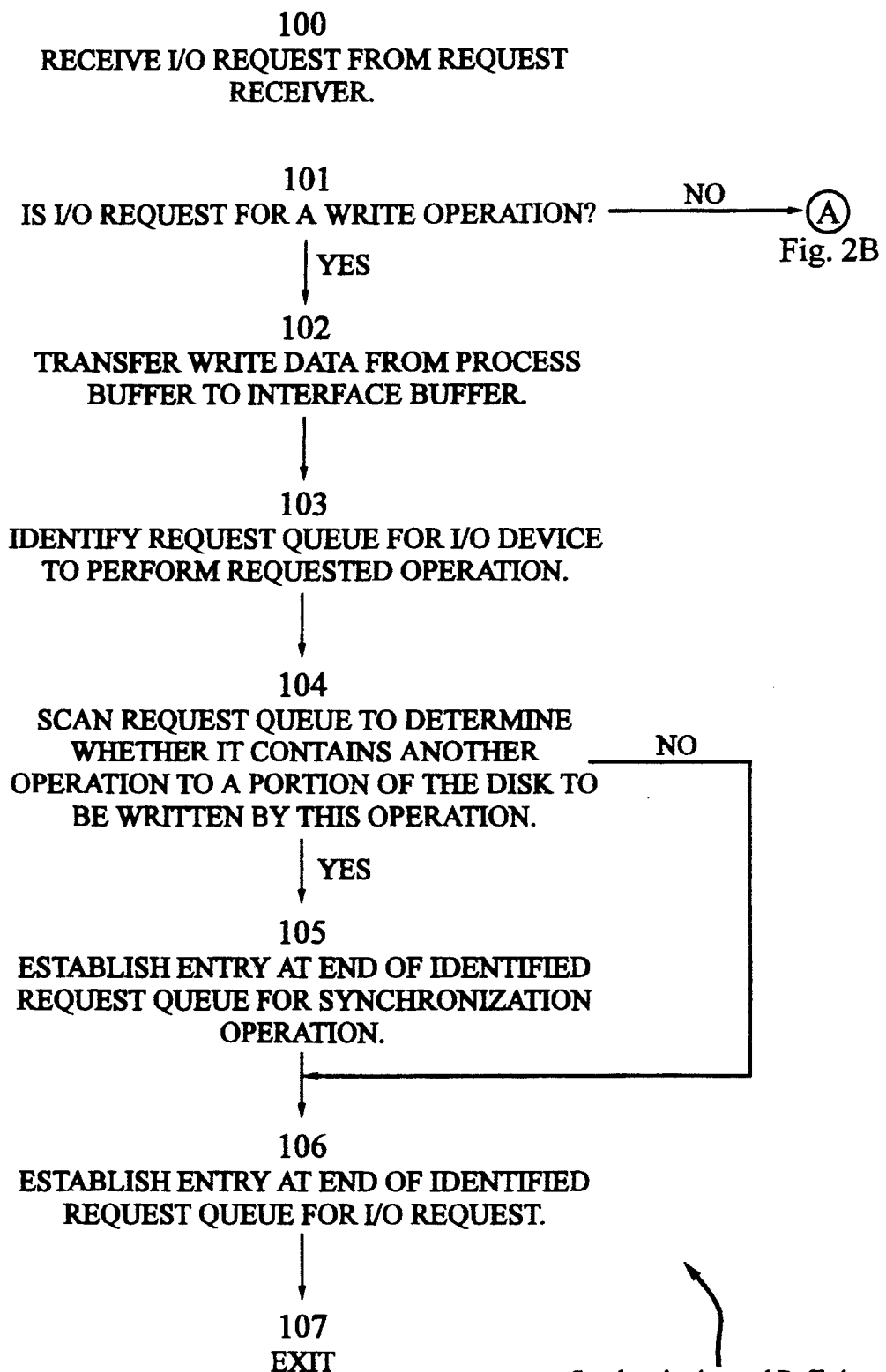
FIGS. 2A through 3C are flow diagrams illustrating the operation of the digital data processing system depicted in FIG. 1.
Figure 2B:
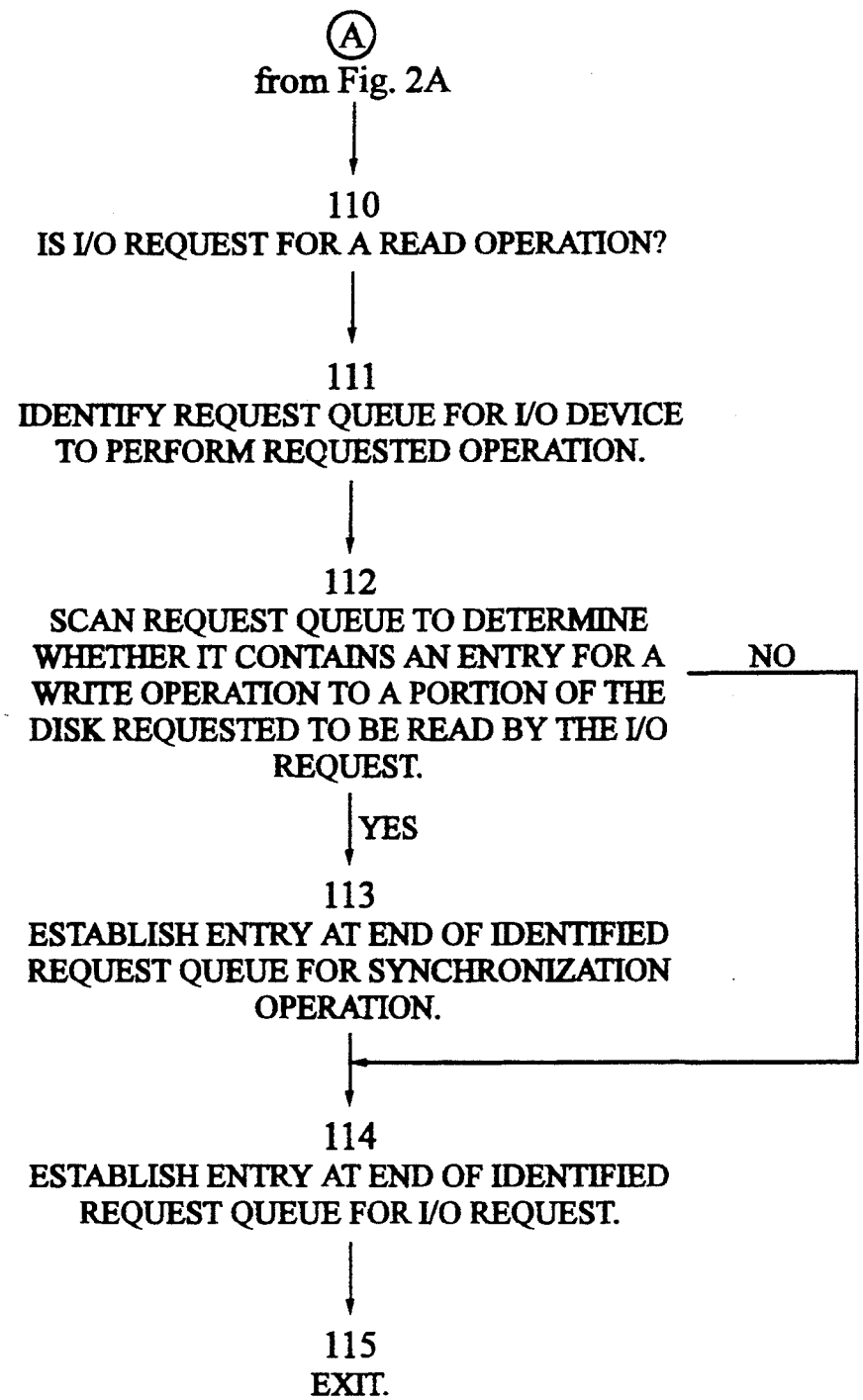
Figure 3B:
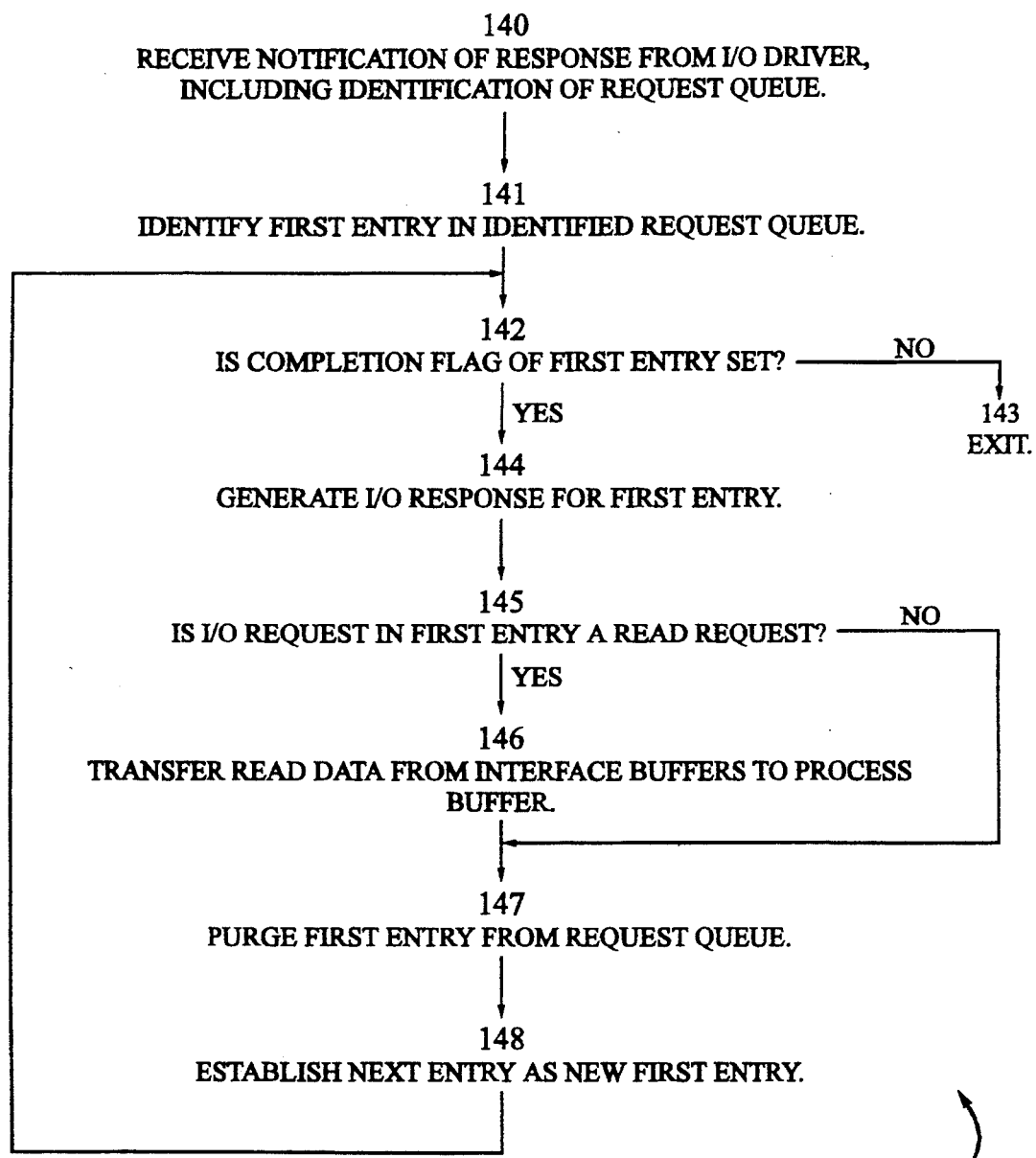

With this background, FIGS. 2A through 3C contain flow diagrams illustrating the operations performed by various elements of the process input/output interface 17 in connection with these four techniques. In particular, FIGS. 2A and 2B detail the operations performed by the queue entry generator 24 in establishing entries 25 in a request queue 22 in accordance with the synchronization technique. FIG. 3A details the operations performed by the response generator 30 in accordance with the re-ordering, buffering and batching techniques. FIGS. 3B and 3C detail the operations performed by the response generator 30 in accordance with, respectively, the re-ordering technique and the batching technique.

FIGS. 2A and 2B detail the operations performed by the queue entry generator in establishing entries in a request queue 22 in accordance with the synchronization technique. With reference to FIG. 2A, the queue entry generator 24, first receives an input/output request from the request receiver 23 (step 100). The input/output request includes the identification of an input/output device 13, the operation it is to perform, and the location on the input/output device 13 at which the operation is to be performed. After receiving the input/output request, the queue entry generator 24 determines, from the input/output request, whether the requested operation is a write operation (step 101). If so, to accomplish the buffering technique, the queue entry generator 24 transfers the data to be written from the process buffer 21 of the process 11 which issued the input/output request (step 102).

Thereafter, the queue entry generator 24 identifies, from the input/output request, the request queue 22 associated with the input/output device 13 to perform the requested operation (step 103) and scans the identified request queue to determine whether it contains another entry for an operation to the portion of the storage device 14 for which the input/output request is requesting a write operation (step 104). If so, the queue entry generator 24 establishes an entry 25, at the end of the identified request queue 22, for the synchronization operation (step 105). The queue entry generator 24, either after step 105 or following step 104 if it determines then that the request queue 22 does not contain an entry for another operation to the same portion of the disk, establishes an entry 25 at the end of the identified request queue 22 for the input/output request (step 106). The queue generator 24 thereafter exits (step 107).

If, on the other hand, the queue entry generator 24 determines, in step 101, that the input/output request is not for a write operation, it sequences to step 110 to determine if the input/output request is for a read operation. If the input/output request is not for a read operation (it may be, for example, for other types of operations, such as those enabling the input/output device to move the input/output device's disk head to a specified location on the disk, and so forth), the queue entry generator 24 proceeds to other sequences (not shown) to establish an entry for that operation. If the queue entry generator 24 determines, in step 110, that the input/output request is for a read operation, it sequences to step 111, in which it identifies the request queue 22 associated with the input/output device 13 that is to perform the requested operation. Thereafter, the queue entry generator 24 scans the identified request queue to determine whether it contains an entry for a write operation to a portion of the storage device 14 for which the input/output request is requesting a read operation (step 112). If so, the queue entry generator 24 establishes an entry 25, at the end of the request queue 22, for the synchronization operation (step 113). After step 112, if the queue entry generator 24 determines that the request queue 22 does not contain an entry for a write operation to a portion of the storage device 14 for which the input/output request is requesting a read operation, or following step 113, the queue entry generator 24 establishes an entry 25, at the end of the request queue 22, for the read operation requested in the input/output request (step 114). The queue entry generator thereafter exits (step 115).

It will be appreciated that, depending on the types of operations which can be identified in the operation field 31 of the entries 25 in the request queues 22, which, in turn, are used by the input/output controllers 16 in establishing the commands for the input/output devices' respective command lists 15, the synchronization operation may be encoded in the operation field 31 of the entry 25 which also enables the synchronization operation. The input/output controller 16 may, for example, perform a "synchronized read" operation, which may be enabled by a single operation identifier which may be provided in operation field 31 of an entry 25, in which operation the input/output controller first performs the synchronization operation, as described above, and then enables the input/output device to perform the read operation.

As described above, after the input/output subsystem 12 performs an operation, it generates a response, identifying the entry 25 in the request queue 22 which identified the operation, which it transmits to its associated input/output driver. In addition, in accordance with the buffering technique, if the operation was a read operation, the input/output subsystem transfers the requested data to an interface buffer 36 in the process input/output interface 17. Upon receipt of a response from an input/output subsystem, the input/output driver sets the completion flag 34 of the identified entry 25 and notifies the response generator 30, which, in turn, generates an input/output response for the process 11 in accordance with the re-ordering and batching techniques. The operations performed by the response generator 30 are depicted in FIG. 3A.

With reference to FIG. 3A, the response generator 30 first receives notification from the input/output driver 26 of the response from the input/output subsystem 12 (step 120). The notification includes at least the identification of a request queue 22, and may also specify the entry 25 in the request queue 22 for the operation that was just completed, and, if the operation was a read operation, the identification of an interface buffer 36 which contains the read data. The response generator 30 proceeds to determine, based on the completion flags 34 of the entries 25 in the request queue, and the quantum numbers in their fields 35, whether it is at that point to generate any input/output responses. In this operation, in accordance with both the re-ordering technique and the batching technique, the response generator 30 iteratively tests completion flags for entries 25 in the identified request queue whose quantum number fields 35 contain the same quantum identification value, and if they are all set, generates input/output responses therefor, in the same order as the entries 25 in the request queue 22, for transmission to the respective processes 11. In addition, with each input/output response for an entry 25 specifying a read operation, the response generator 30 transfers the read data from the interface buffer 36 to the process's process buffer 21. The response generator 30 then purges those entries 25 from the request queue, and performs the same operations in connection with the next series of entries 25. The response generator 30 iteratively performs this process until it reaches entries 25 whose quantum identification fields contain the same value as the quantum identification from the quantum timer 37, or until it reaches a set of entries 25, all of which contain the same value in their quantum identification fields 35, but at least one of which does not have a set completion flag 34.

More specifically, the response generator 30 initially identifies the first entry in the identified request queue (step 121) and determines whether the value of the quantum identification from the quantum timer 37 is greater than the value of the quantum number field 35 in the entry 25. If it is not, the time slot identified by the quantum identification from the quantum timer is not over, and so the response generator 30 exits (step 123) and does not generate input/output responses for any entries 25.

If, however, the response generator 30 determines in step 122 that the value of the quantum identification from the quantum timer 37 is greater than the value of the quantum number field 35 in the first entry 25 in the request queue 22, determines whether that entry's completion flag is set (step 124). If not, the response generator 30 also does not generate input/output responses for any entries 25, and it also exits (step 125). On the other hand, if the response generator 3 determines, in step 124, that the first entry's completion flag 34 is set, it sequences to step 126 to identify any subsequent entries in the request queue 22 (which, it will be appreciated, will immediately follow the first entry 25 in the queue) which have the same quantum identification values in their respective fields 35, and determine whether their completion flags 34 are also set. If not, the response generator 30 does not generate input/output responses for any of the entries 25 identified in steps 121 or 126, since not all of the operations enabled thereby have been completed, and so it exits (step 127).

On the other hand, if the response generator 30 determines, in step 126, that the completion flags 34 are set in the subsequent entries 25 in the request queue with the same value in their quantum number fields 35 as the first entry 25, the response generator 30 iteratively generates input/output responses for each of the succeeding entries, that were identified in steps 121 and 126, in the same order they were listed in the request queue (step 128). Contemporaneously with generation of an input/output response for an entry 25, if the entry 25 specifies a read operation, the response generator 30 transfers the data from an interface buffer 36 to the process's process buffer 21. In addition, the response generator 30 purges the entries 25 from the request queue 22, and establishes the first entry 25 that was not purged as a new first entry (step 129). The new first entry 25 in the request queue 22 has a quantum identification value in its quantum number field 35 that is greater than the quantum identification value of the purged entries 25, and the response generator 30 returns to step 122 to repeat the operations in steps 122 through 129 using that entry as the first entry. The response generator 30 repeats the operations until it either locates an entry 25 whose completion flag is not set, indicating that its operation has not been completed, or it locates an entry which has, in its field 35, a quantum identification value that corresponds to the quantum identification generated by quantum timer 37.

The operations performed by a response generator 30 which only performs the re-ordering and buffering techniques are depicted in FIG. 3B, and the operations performed by a response generator 30 which only performs the batching and buffering techniques are depicted in FIG. 3C. These operations have been described in detail above in connection with the detailed discussion of each technique, and will only be generally described here. With reference to FIG. 3B, if the response generator 30 only performs the re-ordering technique, upon receipt of a notification from the input/output driver (step 140), it identifies the queue 22 and the first entry 25 therein (step 141), and determines whether its completion flag 34 is set (step 142). If not, the response generator 30 exits and does not generate any input/output responses (step 143). On the other hand, if the response generator 30 determines that the completion flag is set (step 142), it generates an input/output response for the entry (step 144). For the buffering technique, the response generator 30 then determines whether the input/output request for which it generated the input/output response enabled a read operation (step 145), and, if so, transfers the read data from the interface buffers 36 to the process's process buffer 21 (step 146). Following step 146, or step 145 if the response generator determined that the input/output request did not enable a read operation, purges the entry 25 from the request queue 22 (step 147) and establishes the next entry as the new first entry in the queue (step 148). The response generator 30 repeats steps 142 through 148 until it reaches the first entry 25 in the queue whose completion flag is not set, at which point it exits (step 143).

With reference to FIG. 3C, if the response generator 30 performs only the batching technique, upon receiving the identification from the input/output driver of the entry 25 for which it received a response from an input/output subsystem 12 (step 150), the response generator 30 first locates the identified entry (step 151) and determines its quantum identification value (step 152). If the quantum identification generated by the quantum timer 37 does not exceed this value (step 153), the response generator 30 does not generate any input/output responses, and so it exits (step 154). On the other hand, if the quantum identification generated by the quantum timer 37 is greater than the value in the entry's quantum identification field 35, it scans the request queue 22 for any entries 25, which may precede or succeed the identified entry 25 in the request queue 22, whose quantum number fields 35 contain the same value as contained in the quantum number field 35 of the identified entry 25, and determines whether all of their completion flags 34 are set (step 155). If not, the input/output device 13 has not completed operations for all of the entries with the same quantum identification number in their respective fields 35, and so it exits (step 156). On the other hand, if all of the completion flags are set (step 155), the input/output device 13 has completed operations for all of the entries 25 with the same quantum identification number in their respective fields 35, and so the response generator 30 generates input/output responses for those entries. Contemporaneously with generation of each read response, if the associated request entry 25 enabled a read operation, the response generator 30 transfers the data from the interface buffers 36 to the process's process buffer 21. Thereafter, the response generator purges the request entries 25 for which it generated input/output responses from the request queue 22 (step 157), after which it exits (step 158).

The digital data processing system 10, and in particular the process input/output interface 17, thus provides for enhanced security of data by reducing or eliminating a number of covert channels which may exist as a result of sharing of resources among processes.

The foregoing description has been limited to a specific embodiment of this invention. It will be apparent however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of operating a computer system, referred to for convenience as a prioritized completion reordering security method, to process an input/output (I/O) request, referred to as R1, generated by a requesting process P1 executing in said computer system, (1) the computer system including (A) and I/O subsystem which performs and reports completion of at least one type of I/O operation in response to I/O requests, and (B) addressable memory, (2) said I/O request R1 comprising a request that the I/O subsystem transfer requested data between the I/O subsystem and a process buffer BP associated with said requesting process P1, said request being for a transfer either from the I/O subsystem to the process buffer BP or vice versa, said method comprising the steps of:

(a) receiving the I/O request R1;

(b) writing an entry E1 corresponding to the I/O request R1 into a request queue in said addressable memory, said entry E1 including a priority indication;

(c) initiating processing of the I/O request R1 by the I/O subsystem;

(d) receiving a completion report from the I/O subsystem indicating completion of the requested data transfer;

(e) performing tests (1) and (2) as follows:

(1) testing whether said request queue is empty of any subsets, any such subset comprising one or more additional entries E2, any such additional entry E2 in turn corresponding to an additional I/O request R2 generated by one or more additional requesting processes P2, wherein one or more of said additional requesting processes P2 may be the same process as the requesting process P1, (2) if test (1) fails, then testing whether completions of all said additional I/O requests R2 that have higher priorities than the I/O request R1 have been reported to the respective corresponding additional requesting process P2;

(f) if either of tests (1) and (2) in step (e) is satisfied, then reporting completion of the I/O request R1 to the requesting process P1, else deferring said reporting of completion to the requesting process P1.

2. A prioritized completion reordering security method as in claim 1, wherein the request queue referred to in step 1(b) is organized as a first-in/first-out (FIFO) queue.

3. A prioritized completion reordering security method as in claim 1, wherein the priority indication referred to in step 1(b) is a function of the position of said I/O request in the request queue.

4. A prioritized completion reordering security method as in claim 2, wherein each said entry in the FIFO request queue is associated with an I/O request generated by said requesting process P1.

5. A prioritized completion reordering security method as in claim 2, wherein said FIFO request queue is a subqueue of a request queue that in turn comprises entries associated with a plurality of requesting processes.

6. A prioritized completion reordering security method as in claim 1, further comprising:
(a) in conjunction with said step 1(b) of writing said entry E1 in the request queue, the substep of clearing a completion flag associated with said I/O request; and
(b) in conjunction with said step 1(d) of receiving a completion report from the I/O subsystem, the step of setting said completion flag.

7. A prioritized completion reordering security method as in claim 6, wherein said completion flag comprises a part of said request queue.

8. A prioritized completion reordering security method as in claim 6, wherein said completion flag comprises a part of said entry E1.

9. A prioritized completion reordering security method as in claim 1, wherein said entry in the request queue is associated with an I/O request generated by said requesting process P1.

10. A prioritized completion reordering security method as in claim 1, wherein the test of step 1(e)(2) is applied only to additional I/O requests R2 generated by said requesting process P1.

11. A prioritized completion reordering method as in claim 1, referred to for convenience as a prioritized completion reordering and buffering security method:
(a) wherein the I/O request R1 is a read request;
(b) wherein the processing initiated in step 1(c) transfers data between said I/O subsystem and an intermediate buffer BI; and
(c) further comprising a step 1(g) of transferring the requested data between said intermediate buffer BI and said process buffer BP in conjunction with reporting the completion of said I/O request R1 to the requesting process P1.

12. A prioritized completion reordering method as in claim 1:
(a) wherein the I/O request R1 is a request for a write-type operation for transferring requested data from the process buffer BP to the I/O subsystem;
(b) further comprising a step 1(b1), performed in conjunction with step 1(b), of transferring the requested data from the process buffer BP to an intermediate buffer BI; and (c) wherein the processing initiated in step 1(c) transfers the requested data between the I/O subsystem and an intermediate buffer BI.

13. A method of operating a computer system, referred to for convenience as a prioritized completion reordering/buffering method, to process an input/output (I/O) request, referred to as R1, generated by a requesting process P1 executing in said computer system, (1) the computer system including (A) an I/O subsystem which performs and reports completion of at least one type of I/O operation in response to I/O requests, and (B) addressable memory, (2) said I/O request comprising a request that the I/O subsystem transfer requested data between the I/O subsystem and a process buffer BP associated with said requesting process P1, wherein the requested data is transferred from the I/O subsystem to the process buffer BP or vice versa, said method comprising the steps of:
(a) receiving the I/O request;
(b) writing an entry E1 corresponding to the I/O request R1 into a first-in/first-out (FIFO) request queue in said addressable memory;
(c) said entry E1 including a completion flag that may be selectively set or cleared;
(d) said request queue having:
(1) an earliest-made entry (which may be the same as the entry E1) corresponding to an earliest-made I/O request (which may be the same as the I/O request R1),
(2) if said earliest-made entry is not the same as said entry E1, said request queue further having zero or more intervening entries corresponding to intervening I/O requests made by respective intervening requesting processes (any one or more of which may be the same as the requesting process P1),
(3) each of said earliest-made entry and said intervening entries having a respective completion flag;
(e) if the I/O request R1 is a write-type operation, then transferring said request data from said process buffer BP to an intermediate buffer BI;
(f) clearing the completion flag associated with said I/O request R1;
(g) initiating processing of the I/O request by the I/O subsystem;
(h)
(1) if said I/O request R1 is a read-type operation, then transferring said requested data from the I/O subsystem to an intermediate buffer BI,
(2) else if said I/O request R1 is a write-type operation, then transferring said requested data from said intermediate buffer BI to the I/O subsystem;
(i) receiving a completion report from the I/O subsystem;
(j) setting the completion flag associated with said I/O request R1;
(k)
(1) testing whether the completion flag of the earliest-made entry in the FIFO request queue is set, and if so, then:
(A) reporting completion of the earliest-made I/O request to the earliest requesting process,
(B) if the earliest-made I/O request is a read-type operation, then transferring said requested data from the intermediate buffer BI to said process buffer BP in conjunction with the completion of step (1)(A),
- (C) deleting the earliest-made entry from the FIFO request queue, resulting either in an empty request queue or in a new earliest-made entry in the request queue, and
- (2) if the FIFO request is nonempty after completion of step (1), then repeating step (1) until (A) the earliest-made entry is an entry whose completion flag is not set, or (B) the request queue is empty.

14. A prioritized completion reordering/buffering method as in claim 13, wherein each said entry in the FIFO request queue is associated with an I/O request generated by said requesting process P1.

15. A prioritized completion reordering/buffering method as in claim 13, wherein said FIFO request queue is a subqueue of a request queue that in turn comprises entries associated with a plurality of requesting processes.

16. A method as in claim 1, referred to for convenience as a prioritized completion reordering/deallocation method, wherein:
- (1) said process buffer BP includes one or more allocable memory portions in a memory system that are allocated to said process buffer BP, and
- (2) said I/O request R1 is for a transfer of requested data between one or more requested-data memory portions of said memory portions allocated to the process buffer BP and the I/O subsystem, that is, from the one or more requested-data memory portions to the I/O subsystem or vice versa, said method further comprising the steps of:
- (a) de-allocating said one or more requested-data memory portions from the process buffer BP in conjunction with said step 1 (b) of writing an entry E1 in the request queue; and
- (b) re-allocating said one or more requested-data memory portions to the process buffer BP in conjunction with step 1 (f) of reporting completion of the I/O request R1 to the requesting process P1.

17. A method as in claim 16, wherein each said allocable memory portion constitutes a group of contiguous memory locations, referred to for convenience as a page.

18. A method as in claim 1, referred to for convenience as a prioritized completion reordering/deallocation/shared-pages method, wherein:
- (1) said process buffer BP includes one or more allocable memory portions in a memory system that are allocated to said process buffer BP.
- (2) said I/O request R1 is for a transfer of requested data between one or more requested-data memory portions of said memory portions allocated to the process buffer BP and the I/O subsystem, that is, from the one or more requested-data memory portions to the I/O subsystem or vice versa, and
- (3) one or more of said requested-data memory portions is shared with one or more additional processes P2 executing in said computer system, and comprising the steps of:
- (a) de-allocating said one or more requested-data memory portions from the process buffer BP and from said additional processes P2 in conjunction with said step 1(b) of writing an entry E1 in the request queue;
- (b) re-allocating said one or more requested-data memory portions to the process buffer BP and to said additional processes P2 in conjunction with step 1(f) of reporting completion of the I/O request R1 to the requesting process P1.

19. A method as in claim 18, wherein each said allocable memory portion constitutes a group of contiguous memory locations, referred to for convenience as a page.

20. A method of operating a computer system, referred to for convenience as a prioritized completion reordering/deallocation/shared-pages method, to process in an input/output (I/O) request, referred to as R1, generated by a requesting process P1 executing in said computer system,
- (1) the computer system including (A) an I/O subsystem which performs and reports completion of at least one type of I/O operation in response to I/O requests, and (B) addressable memory,
- (2) said I/O request comprising a request that the I/O subsystem transfer requested data between the I/O subsystem and a process buffer BP associated with said requesting process P1, that is, from the I/O subsystem to the process buffer BP or vice versa,
- (3) said process buffer BP including one or more allocable memory portions in a memory system that are allocated to said process buffer BP,
- (4) said I/O request R1 being for a transfer of requested data between one or more "requested-data memory portions" of said memory portions allocated to the process buffer BP and the I/O subsystem, that is, from the one or more requested-data memory portions to the I/O subsystem or vice versa, and
- (5) one or more of said requested-data memory portions being shared with one or more additional processes executing in said computer system, said method comprising the steps of:
- (a) receiving the I/O request;
- (b) writing an entry E1 corresponding to the I/O request R1 into a first-in/first-out (FIFO) request queue in said addressable memory;
- (c) said entry E1 including a completion flag that may be selectively set or cleared;
- (d) said request queue having:
  - (1) an earliest-made entry EE (which may be the same as the entry E1) corresponding to an earliest-made I/O request RE (which may be the same as the I/O request R1) generated by an earliest requesting process PE (which may be the same as the process P1) and associated with a de-allocated requested-data memory portion of a process buffer BE associated with the requesting process PE,
  - (2) if said earliest-made entry EE is not the same as said entry E1, said request queue further having zero or more intervening entries corresponding to intervening I/O requests made by respective intervening requesting processes (any one or more of which may be the same as the requesting process P1),
  - (3) each of said earliest-made entry EE and said intervening entries having a respective completion flag;
- (e) de-allocating said one or more requested-data memory portions from the process buffer BP in conjunction with said step (b) of writing entry E1 to the request queue;

(f) clearing the completion flag associated with said I/O request R1;
(g) initiating processing of the I/O request R1 by the I/O subsystem;
(h) receiving a completion report from the I/O subsystem for the I/O request R1;
(i) setting the completion flag associated with said I/O request R1; and
(j)
  (1) testing whether the completion flag of the earliest-made entry in the FIFO request queue is set, and if so, then:
    (A) reporting completion of the earliest-made I/O request RE to the earliest requesting process,
    (B) re-allocating the requested-data memory portions of the process buffer BE to the buffer BE in conjunction with step (A) of reporting completion of the earliest-made I/O request RE to the requesting process PE,
    (C) deleting the earliest-made entry from the FIFO request queue, resulting either in an empty request queue or in a new earliest-made entry in the request queue; and
  (2) if the FIFO request queue is nonempty after completion of step (1), then repeating step (1) until (A) the earliest-made entry is an entry whose completion flag is not set, or (B) the request queue is empty.

21. A method of operating a computer system, referred to for convenience as a prioritized completion reordering/buffering/batching method, to process an input/output (I/O) request, referred to as R1, generated by a requesting process P1 executing in said computer system,
  (1) the computer system including (A) and I/O subsystem which performs and reports completion of at least one type of I/O operation in response to I/O requests, and (B) addressable memory,
  (2) said I/O request comprising a request that the I/O subsystem transfer requested data between the I/O subsystem to a process buffer BP associated with said requesting process P1, that is, from the I/O subsystem to the process buffer BP or vice versa,
said method comprising the steps of:
  (a) receiving the I/O request;
  (b) writing an entry E1 corresponding to the I/O request R1 into a first-in/first-out (FIFO) request queue in said addressable memory;
  (c) said entry E1 including a completion flag that may be selectively set or cleared;
  (d) assigning the I/O request R1 to a completion-reporting time slot having parameters including a beginning time and an ending time;
  (e) said request queue having:
    (1) an earliest-made entry EE (which may be the same as the entry E1) corresponding to an earliest-made I/O request RE (which may be the same as the I/O request R1) generated by an earliest requesting process PE (which may be the same as the process P1) and associated with a de-allocated requested-data memory portion of a process buffer BE associated with the requesting process PE,
    (2) if said earliest-made entry EE is not the same as said entry E1, said request queue further having zero or more intervening entries corresponding to intervening I/O requests made by respective intervening requesting processes (any one or more of which may be the same as the requesting process P1),
    (3) each of said earliest-made entry EE and said intervening entries having a respective completion flag;
    (4) each of said earliest-made I/O request RE and said zero or more intervening I/O requests having a respective completion-reporting time slot;
  (f) if the I/O request R1 is a write-type operation, then transferring said requested data from said process buffer BP to an intermediate buffer BI;
  (g) clearing the completion flag associated with said I/O request R1;
  (h) initiating processing of the I/O request by the I/O subsystem;
  (i)
    (1) if said I/O request R1 is a read-type operation, then transferring said requested data from the I/O subsystem to an intermediate buffer BI,
    (2) else if said I/O request R1 is a write-type operation, then transferring said requested data from said intermediate buffer BI to the I/O subsystem;,
  (j) receiving a completion report from the I/O subsystem;
  (k) setting the completion flag associated with said I/O request R1;
  (l)
    (1) testing whether the completion flag of the earliest-made entry in the FIFO request queue is set, and if so, then:
      (A) reporting completion of the earliest-made I/O request RE to the earliest requesting process PE at a time that is selected as a function of one or more of said parameters of the respective completion-reporting time slot associated with said earliest-made I/O request RE,
      (B) if said earliest-made I/O request is a read-type operation, then transferring said requested data from the intermediate buffer BI to said process buffer BP in conjunction with step (1)(A), and
      (C) deleting the earliest-made entry from the FIFO request queue, resulting either in an empty request queue or in a new earliest-made entry in the request queue; and
    (2) if the FIFO request queue is nonempty after completion of step (1), then repeating step (1) until (A) the earliest-made entry is an entry whose completion flag is not set, or (B) the request queue is empty.

22. A method as in claim 21 wherein said respective time slots are of uniform length.

23. A method as in claim 21 wherein said selected time is no earlier than the end of said respective time slot.

24. A method as in claim 21, wherein each said I/O request is assigned to a time slot encompassing the time at which the I/O request is received at step 21(a).

25. A method of operating a computer system, referred to for convenience as a prioritized completion reordering/deallocation/batching method, to process an input/output (I/O) request, referred to as R1, generated by a requesting process P1 executing in said computer system,
  (1) the computer system including (A) an I/O subsystem which performs and reports completion of at least one type of I/O operation in response to I/O requests, and (B) addressable memory, (2) said I/O request comprising a request that the I/O subsystem transfer requested data between the I/O subsystem to a process buffer BP associated with said requesting process P1, that is, from the I/O subsystem to the process buffer BP or vice versa, (3) said process buffer BP including one or more allocable memory portions in a memory system that are allocated to said process buffer BP, (4) said I/O request R1 being for a transfer of requested data between one or more requested-data memory portions of said memory portions allocated to the process buffer BP and the I/O subsystem, that is, from the one or more requested-data memory portions to the I/O subsystem or vice versa, said method comprising the steps of:
- (a) receiving the I/O request;
- (b) writing an entry E1 corresponding to the I/O request R1 into a first-in/first-out (FIFO) request queue in said addressable memory;
- (c) said entry E1 including a completion flag that may be selectively set or cleared;
- (d) said request queue having:
  - (1) an earliest-made entry (which may be the same as the entry E1) corresponding to an earliest-made I/O request (which may be the same as the I/O request R1),
  - (2) if said earliest-made entry is not the same as said entry E1, said request queue further having zero or more intervening entries corresponding to intervening I/O requests made by respective intervening requesting processes P2, any one or more of which may be the same as the requesting process P1,
  - (3) each of said earliest-made entry and said zero or more intervening entries having a respective completion flag,
  - (4) each of said earliest-made I/O request and said zero or more intervening I/O requests having a respective completion-reporting time slot;
- (e) assigning the I/O request R1 to a completion-reporting time slot having parameters including a beginning time and an ending time;
- (f) de-allocating said one or more requested-data memory portions from the process buffer BP and from said additional processes P2 in conjunction with said step (b) of writing a entry E1 in the request queue;
- (g) clearing the completion flag associated with said I/O request R1;
- (h) initiating processing of the I/O request by the I/O subsystem;
- (i) receiving a completion report from the I/O subsystem;
- (j) setting the completion flag associated with said I/O request R1;
- (k)
  - (1) testing whether the completion flag of the earliest-made entry in the FIFO request queue is set, and if so, then:
    - (A) reporting completion of the earliest-made I/O request to the earliest requesting process at a time that is selected as a function of one or more of said parameters of the respective completion-reporting time slot associated with said earliest-made I/O request,
    - (B) re-allocating said one or more requested-data memory portions to the process buffer BP and to said additional processes P2 in conjunction with step (A) of reporting completion of the earliest-made I/O request to the requesting process P1,
    - (C) deleting the earliest-made entry from the FIFO request queue, resulting either in an empty request queue or in a new earliest-made entry in the request queue; and
  - (2) if the FIFO request queue is nonempty after completion of step (1), then repeating step (1) until (A) the earliest-made entry is an entry whose completion flag is not set, or (B) the request queue is empty.

26. A method of operating a computer system, referred to for convenience as a synchronization method, to process an input/output (I/O) request R2, generated by a requesting process P2 executing in said computer system, the I/O request R2 being directed to an I/O subsystem in the computer system which performs and reports completion of I/O requests to write information to addressable memory or to read information from addressable memory, said method comprising the steps of:
- (a) receiving the I/O request R2 from the process P2;
- (b) queuing an entry E2 corresponding to the I/O request R2 on a request queue, in addressable memory, of zero or more entries each corresponding to a respective I/O request generated by a requesting process executing in said computer system;
- (c) testing whether the request queue includes an entry, referred to as entry E1, representing an I/O request R1 generated by a requesting process P1, which may be the same process as process P2, where the I/O request R1 refers to addressable memory at least a portion of which is referred to in I/O request R2;
- (d) testing whether both I/O requests R1 and R2 are read-type I/O requests; and
- (e) if the test of step (c) is satisfied but the test of step (d) is not satisfied, then delaying the processing of I/O request R2 until the I/O subsystem has reported completion of I/O request R1.

27. A synchronization method as in claim 26, wherein each entry in the request queue includes an indication of the priority of the I/O request associated with the entry.

28. A synchronization method as in claim 26:
- (a) wherein the request queue is a first-in/first-out (FIFO) queue; and
- (b) further comprising the steps of:
  - (1) inserting a synchronization entry ES on the request queue after the entry E1 and ahead of the entry E2, and
  - (2) waiting to begin processing of I/O request R2 until completion has been reported for all I/O requests corresponding to entries in the request queue ahead of the synchronization entry ES.

29. A synchronization method as in claim 26:
- (a) wherein the request queue is a first-in/first-out (FIFO) queue; and
- (b) further comprising the steps of:
  - (1) testing whether the request queue includes a synchronization entry ES after the entry E1 and ahead of the entry E2, and if not, inserting a synchronization entry ES on the request queue after the entry E1 and ahead of the entry E2; and
  - (2) waiting to begin processing of I/O request R2 until completion has been reported for all I/O requests corresponding to entries in the request queue ahead of the synchronization entry ES.

* * * * *